(12) United States Patent
Leng et al.

(10) Patent No.: US 10,691,410 B2
(45) Date of Patent: Jun. 23, 2020

(54) NEURAL NETWORK COMPUTING

(71) Applicant: Alibaba Group Holding Limited, Grand Cayman (KY)

(72) Inventors: Cong Leng, Beijing (CN); Hao Li, Hangzhou (CN); Zesheng Dou, Beijing (CN); Shenghuo Zhu, Bellevue, WA (US); Rong Jin, Okemos, MI (US)

(73) Assignee: Alibaba Group Holding Limited, Cayman Islands (KY)

( * ) Notice: Subject to any disclaimer, the term of this patent is extended or adjusted under 35 U.S.C. 154(b) by 43 days.

(21) Appl. No.: 16/039,221

(22) Filed: Jul. 18, 2018

(65) Prior Publication Data

US 2019/0026076 A1 Jan. 24, 2019

(30) Foreign Application Priority Data

Jul. 19, 2017 (CN) .......................... 2017 1 0592850

(51) Int. Cl.
| | |
|---|---|
| *G06F 7/544* | (2006.01) |
| *G06F 5/01* | (2006.01) |
| *G06N 3/063* | (2006.01) |
| *G06N 3/08* | (2006.01) |
| *G06F 5/08* | (2006.01) |
| *G06F 7/556* | (2006.01) |
| *G06F 15/78* | (2006.01) |
| *G06N 3/02* | (2006.01) |

(52) U.S. Cl.
CPC .................. *G06F 5/01* (2013.01); *G06F 5/08* (2013.01); *G06F 7/5443* (2013.01); *G06F 7/556* (2013.01); *G06F 15/78* (2013.01); *G06N 3/02* (2013.01); *G06N 3/063* (2013.01); *G06N 3/08* (2013.01); *G06F 2207/4824* (2013.01)

(58) Field of Classification Search
CPC . G06F 5/01; G06F 5/08; G06F 7/5443; G06F 7/556; G06F 15/78; G06N 3/02; G06N 3/063; G06N 3/08
USPC ........................................................ 708/209
See application file for complete search history.

(56) References Cited

U.S. PATENT DOCUMENTS

| | | |
|---|---|---|
| 2015/0170025 A1 | 6/2015 | Wu et al. |
| 2016/0026912 A1 | 1/2016 | Falcon et al. |
| 2016/0179514 A1 | 6/2016 | Oron et al. |
| 2016/0328645 A1 | 11/2016 | Lin et al. |

(Continued)

OTHER PUBLICATIONS

PCT Search Report and Written Opinion dated Oct. 1, 2018, for PCT Application No. PCT/US18/42753, 11 pages.

*Primary Examiner* — Tan V Mai
(74) *Attorney, Agent, or Firm* — Lee & Hayes, P.C.

(57) ABSTRACT

A method including receiving, by a processor, a computing instruction for a neural network, wherein the computing instruction for the neural network includes a computing rule for the neural network and a connection weight of the neural network, and the connection weight is a power of 2; and inputting, for a multiplication operation in the computing rule for the neural network, a source operand corresponding to the multiplication operation to a shift register, and performing a shift operation based on a connection weight corresponding to the multiplication operation, wherein the shift register outputs a target result operand as a result of the multiplication operation. The neural network uses a shift operation, and a neural network computing speed is increased.

20 Claims, 4 Drawing Sheets

(56) References Cited

U.S. PATENT DOCUMENTS

| | | |
|---|---|---|
| 2016/0342892 A1 | 11/2016 | Ross |
| 2017/0102920 A1 | 4/2017 | Henry et al. |
| 2017/0103302 A1 | 4/2017 | Henry et al. |
| 2017/0103314 A1 | 4/2017 | Ross |
| 2018/0046897 A1 | 2/2018 | Kang et al. |
| 2018/0307950 A1* | 10/2018 | Nealis ............... G06K 9/66 |
| 2019/0325311 A1* | 10/2019 | Nakamura ............ G06F 17/11 |

* cited by examiner

NEURAL NETWORK COMPUTING

CROSS REFERENCE TO RELATED PATENT APPLICATIONS

This application claims priority to Chinese Patent Application No. 201710592850.9, filed on 19 Jul. 2017 and entitled "NEURAL NETWORK COMPUTING METHOD AND DEVICE, PROCESSOR, AND COMPUTER READABLE STORAGE MEDIUM", which is incorporated herein by reference in its entirety.

TECHNICAL FIELD

The present disclosure relates to the field of artificial intelligence technologies, and, more particularly, to neural network computing methods and devices, processors, and computer readable storage media.

BACKGROUND

In recent years, deep learning has made major breakthroughs in the field of artificial intelligence, and, more particularly, has achieved breakthrough progress and desired effects in fields such as image, voice, and natural language processing. Deep learning may make full use of powerful computing capability, construct a complex non-linear model by means of multi-layer neural network cascading, and solve end-to-end problems directly based on massive data.

When solving problems by using a Deep Neural Network (DNN), people usually tend to design a more complex network to collect more data in expectation of higher performance. A current DNN has a relatively large number of layers and a relatively large number of connection weights, and the connection weight is usually a 32-bit single-precision floating-point number or a 64-bit double-precision floating-point number. The connection weight is a value used to measure the strength of a connection between an upper-layer neuron and a lower-layer neuron in the neural network. During DNN computing, a floating-point multiplier needs to be invoked to perform a large number of floating-point number multiplication operations, resulting in a relatively low DNN computing speed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The example embodiments of the present disclosure provide neural network computing methods and devices, processors, and computer readable storage media, which increase a neural network computing speed.

According to an aspect, an example embodiment of the present disclosure provides a neural network computing method, wherein the method includes:

receiving, by one or more processors, a computing instruction for a neural network, wherein the computing instruction for the neural network includes a computing rule for the neural network and a connection weight of the neural network, and the connection weight is a power of 2; and inputting, for a multiplication operation in the computing rule for the neural network, a source operand corresponding to the multiplication operation to a shift register, and performing a shift operation based on a connection weight corresponding to the multiplication operation, wherein the shift register outputs a target result operand as a result of the multiplication operation.

According to another aspect, an example embodiment of the present disclosure provides a processor, including:

a value obtaining unit configured to receive a computing instruction for a neural network, wherein the computing instruction for the neural network includes a computing rule for the neural network and a connection weight of the neural network, and the connection weight is a power of 2; and a shift register configured to receive, for a multiplication operation in the computing rule for the neural network, a source operand corresponding to the multiplication operation; perform a shift operation based on a connection weight corresponding to the multiplication operation; and output a target result operand as a result of the multiplication operation.

According to still another aspect, an example embodiment of the present disclosure provides a neural network computing method, wherein the method includes:

receiving a computing instruction for a neural network, wherein the computing instruction for the neural network includes a computing rule for the neural network and a connection weight of the neural network, and the connection weight is a power of 2;

performing, for a multiplication operation in the computing rule for the neural network, a shift operation on a source operand corresponding to the multiplication operation based on a connection weight corresponding to the multiplication operation; and using a result operand of the shift operation as a result of the multiplication operation.

According to still another aspect, an example embodiment of the present disclosure provides a neural network computing device, including: a memory and a processor;

the memory is configured to store executable computer-readable instructions; and the processor is configured to read the executable computer-readable instructions stored in the memory to perform the neural network computing method provided in the example embodiment of the present disclosure.

According to still another aspect, an example embodiment of the present disclosure provides a computer readable storage medium, wherein the computer storage medium stores a computer program instruction; and when the computer program instruction is executed by one or more processors, the neural network computing method provided in the example embodiment of the present disclosure is implemented.

According to the neural network computing methods and devices, the processors, and the computer readable storage media in the example embodiments of the present disclosure, a connection weight of a neural network is a power of 2. The neural network is computed by using a shift operation, and a neural network computing speed is increased.

BRIEF DESCRIPTION OF THE DRAWINGS

To describe the technical solutions in the example embodiments of the present disclosure, the following briefly introduces the accompanying drawings describing the example embodiments. Apparently, the accompanying drawings described in the following merely represent some example embodiments described in the present disclosure, and those of ordinary skill in the art may still derive other drawings from these accompanying drawings without creative efforts.

DETAILED DESCRIPTION

Figure 1:
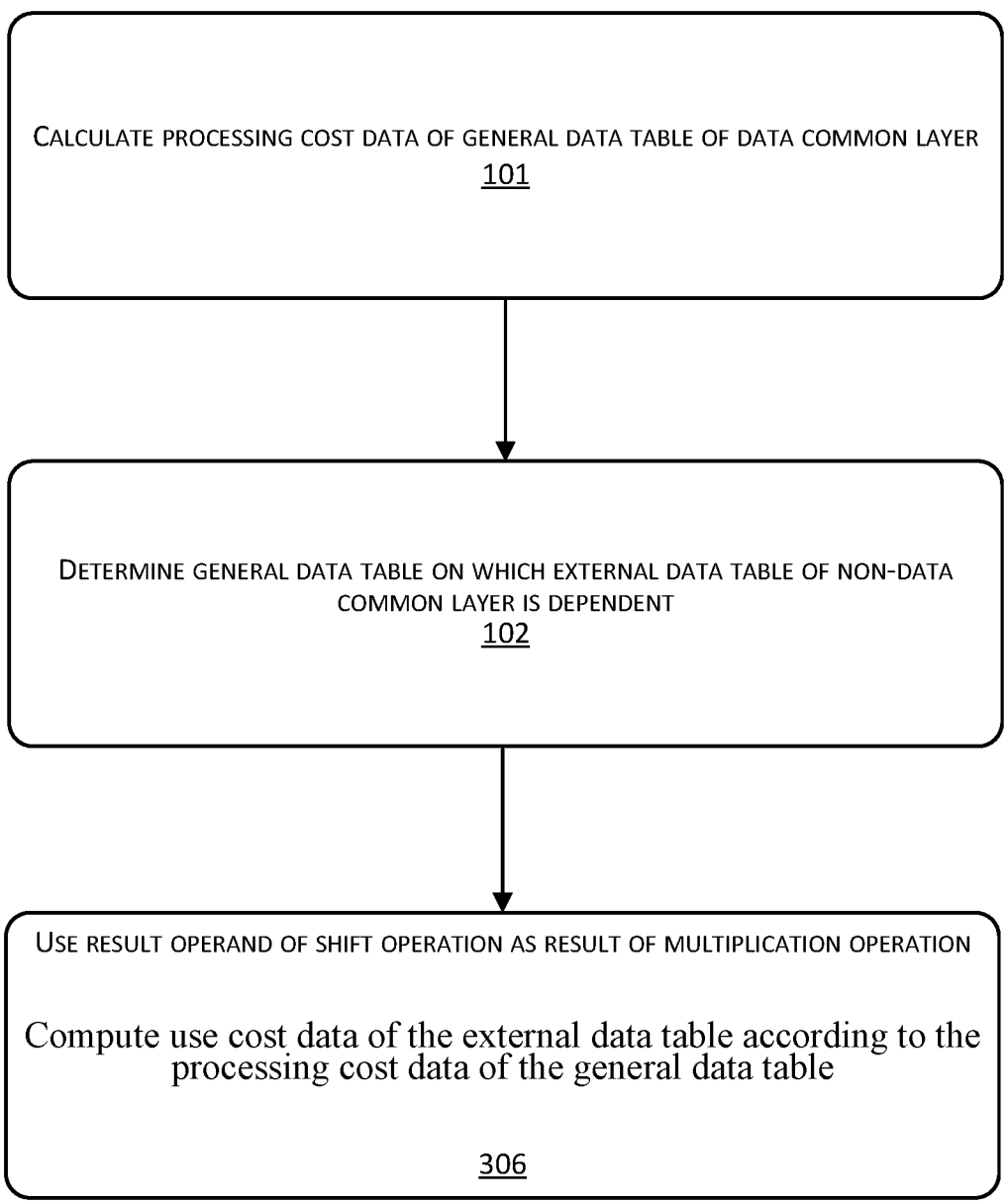
FIG. 1 is a first schematic flowchart of a neural network computing method according to an example embodiment of the present disclosure.

The features and exemplary example embodiments of various aspects of the present disclosure are described below in detail. To make the objectives, technical solutions, and advantages of the present disclosure clearer, the present disclosure is further described in detail with reference to the accompanying drawings and example embodiments. It should be understood that the specific example embodiments described here are only used to explain the present disclosure rather than to limit the present disclosure. Those skilled in the art may implement the present disclosure without some of these specific details. The following description of the example embodiments are only intended to provide a better understanding of the present disclosure by showing an example of the present disclosure.

It should be noted that the relational terms here such as first and second are used only to differentiate an entity or operation from another entity or operation, and do not require or imply any actual relationship or sequence between these entities or operations. Moreover, the terms "include", "comprise", or their any other variants are intended to cover non-exclusive inclusion, so that a process, a method, an article, or a device that includes a series of elements not only includes those elements but also includes other elements which are not expressly listed, or further includes elements inherent to the process, method, article, or device. In the absence of more limitations, an element defined by "include . . . " does not exclude that the process, the method, the article, or the device including the element also have other identical elements.

Because an existing DNN has a relatively large number of layers and a relatively large number of connection weights, and the connection weight is usually a 32-bit single-precision floating-point number or a 64-bit double-precision floating-point number, a DNN model occupies relatively large storage space, and during DNN computing, a floating-point multiplier needs to be invoked to perform a large number of floating-point number multiplication operations, resulting in a relatively low DNN computing speed. In view of this, the example embodiments of the present disclosure provide a neural network computing method and device, a processor, and a computer readable storage medium.

The processor provided in the example embodiments of the present disclosure may be a processor based on an X86 architecture, or may be a processor based on an Advanced Reduced instruction set computing Machine (ARM) architecture, or may be a processor based on a Microprocessor without Interlocked Piped Stages (MIPS) architecture, or certainly may be a processor based on a dedicated architecture, for example, a processor based on a Tensor Processing Unit (TPU) architecture.

Currently, the processor needs to perform a large number of multiplication operations during neural network computing. For one multiplication operation, the processor needs to invoke a multiplier, and input two operands of the multiplication operation to the multiplier, and the multiplier outputs a result. In particular, when the invoked multiplier is a floating-point multiplier, the floating-point multiplier needs to sum order codes of the two operands, multiply mantissas of the two operands, and then normalize and round a result to obtain a final result.

However, when the processor performs a shift operation, a result may be obtained by using the shift register only by inputting the operands to the shift register and then applying a shift pulse signal to the shift register.

It may be seen from above that a computing result may be obtained quickly by using the shift operation than the multiplication operation. Therefore, an example embodiment of the present disclosure provides a neural network computing method, in which a multiplication operation in a neural network is replaced with a shift operation, and the neural network is computed by using the shift operation, to increase a neural network computing speed.

For example, it is assumed that a connection weight of a neural network is a power of 2.

Then for the neural network, during neural network computing, a processor may first obtain a computing rule for the neural network, wherein the computing rule for the neural network specifies whether a multiplication operation or an addition operation is used between operands. For the multiplication operation in the computing rule for the neural network, a source operand corresponding to the multiplication operation is input to a shift register, and a shift operation is performed based on a connection weight corresponding to the multiplication operation. The shift register outputs a target result operand as a result of the multiplication operation.

In an example embodiment of the present disclosure, the connection weight corresponding to the multiplication operation is 2 to the power of N, and N is an integer greater than zero. The source operand corresponding to the multiplication operation may be input to the shift register and shift to the left N times. Alternatively, the source operand corresponding to the multiplication operation may be input to a left-shift register and shift N times.

In another example embodiment of the present disclosure, the connection weight corresponding to the multiplication operation is 2 to the power of negative N, and N is an integer greater than zero. The source operand corresponding to the multiplication operation may be input to the shift register and shift to the right N times. Alternatively, the source operand corresponding to the multiplication operation may be input to a right-shift register and shift N times.

To enable accurate shift of the source operand, in this example embodiment of the present disclosure, the number of bits of the source operand is not greater than the number of bits of a value that may be stored in the shift register. For example, the number of bits of a value that may be stored in the shift register is 8, that is, the shift register is an 8-bit shift register, and the number of bits of the source operand is not greater than 8.

Based on the foregoing process, the neural network computing method provided in this example embodiment of the present disclosure may be summarized as steps shown in FIG. 1. FIG. 1 is a first schematic flowchart of a neural network computing method according to an example embodiment of the present disclosure. The method may include the following steps:

S102: A processor receives a computing instruction for a neural network.

The computing instruction for the neural network includes a computing rule for the neural network and a connection weight of the neural network, and the connection weight is a power of 2.

S104: For a multiplication operation in a computing rule for the neural network, a source operand corresponding to the multiplication operation is input to a shift register, and a shift operation is performed based on a connection weight corresponding to the multiplication operation, wherein the shift register outputs a target result operand as a result of the multiplication operation.

For example, for the multiplication operation in computing rule for neural network, when the connection weight corresponding to multiplication operation is determined to be not 0, the source operand corresponding to multiplication operation is coupled into shift register, and the shift pulse signal is applied to shift register, of which number of times corresponds to connection weight corresponding to the multiplication operation, wherein shift register outputs target result operand According to the neural network computing method provided in this example embodiment of the present disclosure, a multiplication operation in a neural network is replaced with a shift operation, the neural network is computed by using the shift operation, and a neural network computing speed may be increased.

It should be noted that, the processor in this example embodiment of the present disclosure may be a general-purpose processor, or may be a custom processor. The custom processor refers to a processor that is specially used for neural network computing, has a shift register, and does not have a multiplier, that is, the processor is a processor that does not include a multiplication operation unit.

It is assumed that connection weights of the neural network are −4, −2, −1, 0, 1, 2, and 4, respectively. Then the connection weights all may be represented by a 4-bit signed fixed-point integer. ⅛ of the storage space is occupied by a connection weight in a form of a 32-bit single-precision floating-point number. 1/16 of the storage space is occupied by a connection weight in a form of a 64-bit double-precision floating-point number. Because the connection weight of the neural network provided in this example embodiment of the present disclosure occupies relatively small storage space, a model of the entire neural network is also relatively small. In an example solution, a neural network model according to this example embodiment of the present disclosure is within 1 Megabyte (MB). The neural network may be downloaded in a mobile terminal device, and the mobile terminal device computes the neural network. The mobile terminal device does not need to upload data to a cloud server, and may locally perform real-time processing on the data, thus reducing data processing delay and the computing workload of the cloud server.

Figure 2:
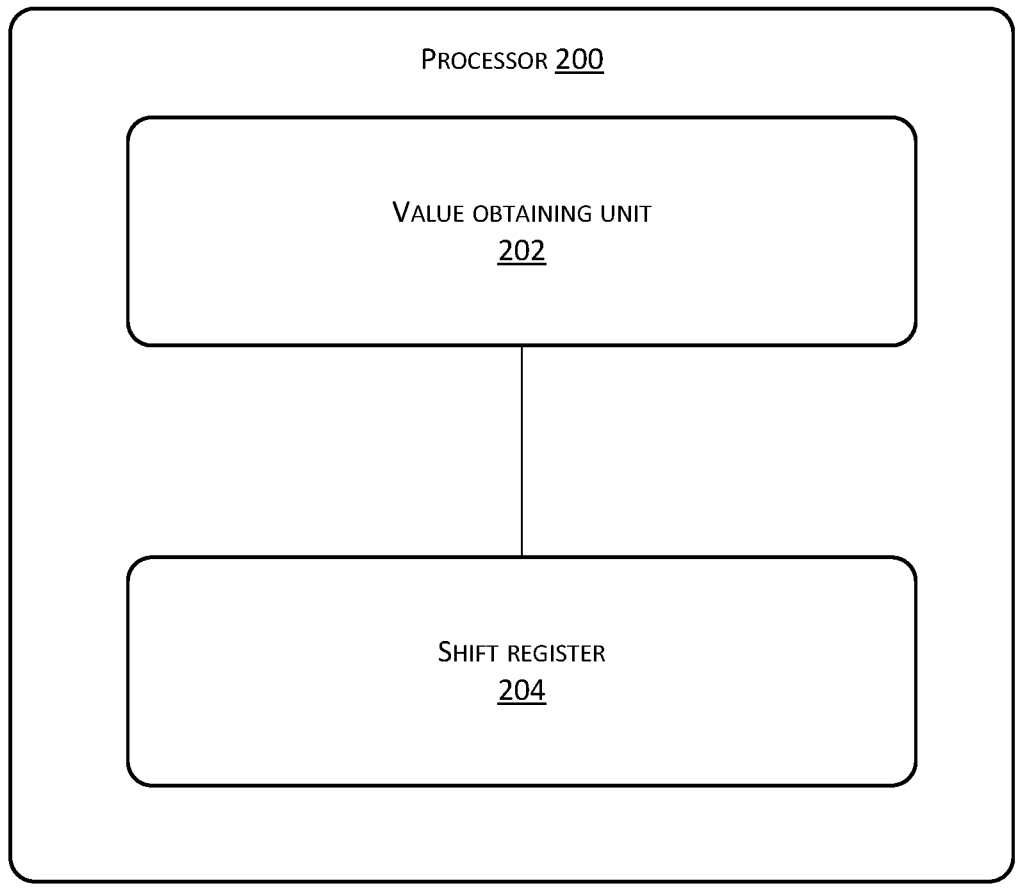
FIG. 2 is a schematic structural diagram of a processor according to an example embodiment of the present disclosure.

Corresponding to the foregoing method example embodiment, an example embodiment of the present disclosure further provides a processor 200, as shown in FIG. 2. FIG. 2 is a schematic structural diagram of the processor 200 according to an example embodiment of the present disclosure. The processor 200 may include: a value obtaining unit 202 and a shift register 204.

The value obtaining unit 202 is configured to receive a computing instruction for a neural network, wherein the computing instruction for the neural network includes a computing rule for the neural network and a connection weight of the neural network, and the connection weight is a power of 2. The value obtaining unit may also be referred to as an instruction fetcher, and each processor has such a component.

The shift register 204 is configured to receive, for a multiplication operation in the computing rule for the neural network, a source operand corresponding to the multiplication operation; perform a shift operation based on a connection weight corresponding to the multiplication operation; and output a target result operand as a result of the multiplication operation.

When the connection weight corresponding to the multiplication operation is 2 to the power of N, and N is an integer greater than zero, the shift register 204 shifts the source operand to the left N times.

When the connection weight corresponding to the multiplication operation is 2 to the power of negative N, and N is an integer greater than zero, the shift register 204 shifts the source operand to the right N times.

The processor provided in this example embodiment of the present disclosure may be a processor based on an X86 architecture, or may be a processor based on an ARM architecture, or may be a processor based on an MIPS architecture, or certainly may be a processor based on a dedicated architecture, for example, a processor based on a TPU architecture.

To enable accurate shift of the source operand, in this example embodiment of the present disclosure, the number of bits of the source operand is not greater than the number of bits of a value that may be stored in the shift register. For example, the number of bits of a value that may be stored in the shift register is 8, that is, the shift register is an 8-bit shift register, and the number of bits of the source operand is not greater than 8.

The processor provided in this example embodiment of the present disclosure may be a general-purpose processor, or may be a custom processor. The custom processor refers to a processor that is specially used for neural network computing, has a shift register, and does not have a multiplier, that is, the processor is a processor that does not include a multiplication operation unit.

An example embodiment of the present disclosure further provides a computer readable storage medium, wherein the computer storage medium stores a computer program instruction; and when the computer program instruction is executed by a processor, the neural network computing method provided in the foregoing example embodiment of the present disclosure.

Figure 3:
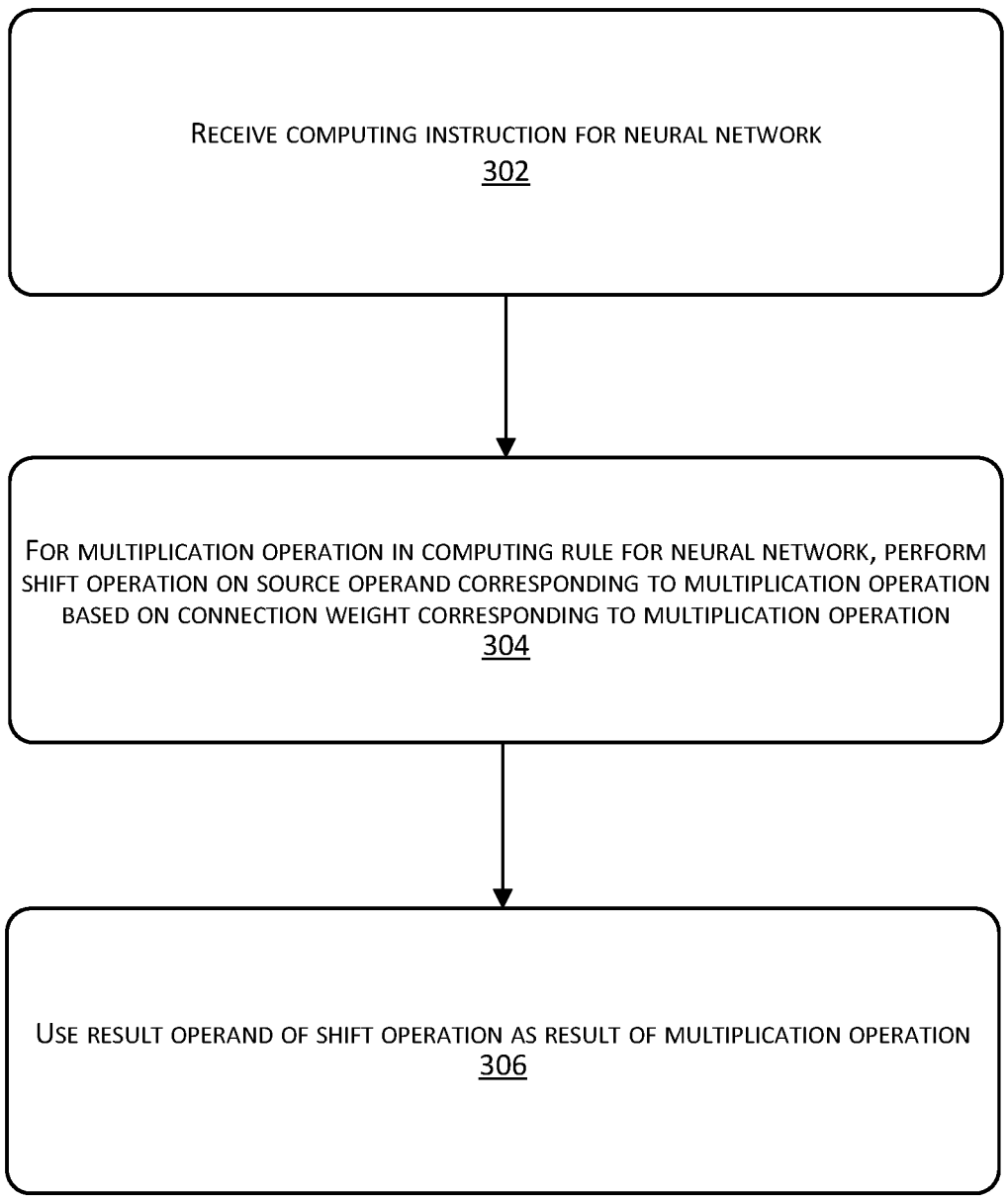
FIG. 3 is a second schematic flowchart of a neural network computing method according to an example embodiment of the present disclosure.

An example embodiment of the present disclosure further provides a neural network computing method, as shown in FIG. 3. FIG. 3 is a second schematic flowchart of a neural network computing method according to an example embodiment of the present disclosure. The method may include the following steps:

S302: A computing instruction for a neural network is received.

The computing instruction for the neural network includes a computing rule for the neural network and a connection weight of the neural network, and the connection weight is a power of 2.

S304: For a multiplication operation in a computing rule for the neural network, a shift operation is performed on a source operand corresponding to the multiplication operation based on a connection weight corresponding to the multiplication operation.

S306: A result operand of the shift operation is used as a result of the multiplication operation.

In an example embodiment of the present disclosure, the connection weight corresponding to the multiplication operation is 2 to the power of N, and N is an integer greater than zero. The source operand may be shifted to the left N times.

In another example embodiment of the present disclosure, the connection weight corresponding to the multiplication operation is 2 to the power of negative N, and N is an integer greater than zero. The source operand may be shifted to the right N times.

Figure 4:
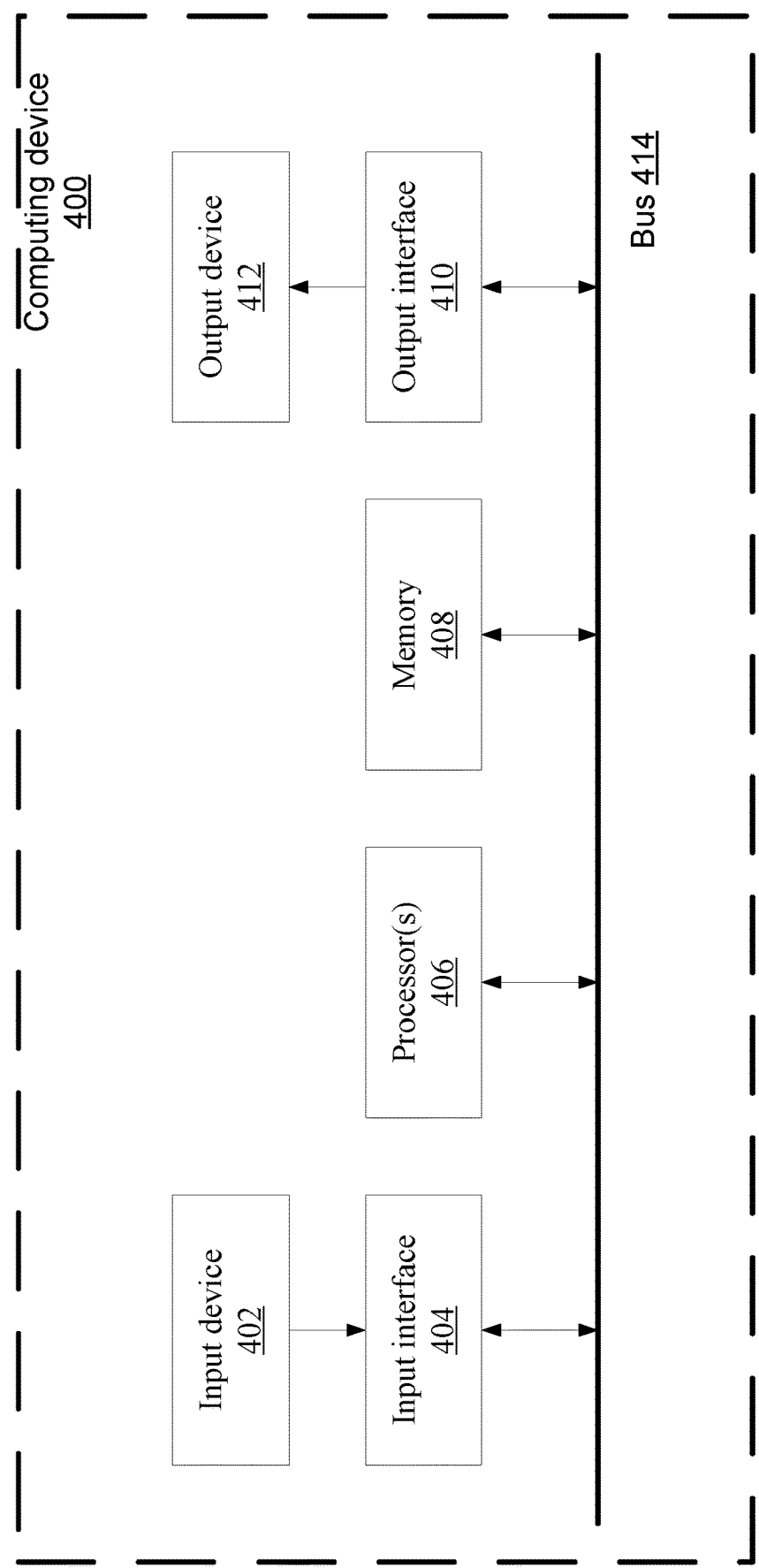
FIG. 4 is a structural diagram of an exemplary hardware architecture of a computing device that may implement a neural network training method according to an example embodiment of the present disclosure.

FIG. 4 is a structural diagram of an exemplary hardware architecture of a computing device that may implement a neural network computing method according to an example embodiment of the present disclosure. As shown in FIG. 4, the computing device 400 includes an input device 402, an input interface 404, one or more processor(s) 406 or data processing unit(s), memory 408, an output interface 410, and an output device 412. The input interface 404, the processor(s) 406, the memory 408, and the output interface 410 are connected to each other by using a bus 414. The input device 402 and the output device 412 are respectively connected to the bus 414 by using the input interface 404 and the output interface 410, and then are connected to another component of the computing device 400.

The memory 404 is an example of computer readable storage media.

Computer readable storage media, including both permanent and non-permanent, removable and non-removable media, may be stored by any method or technology for storage of information. The information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory Such as ROM, EEPROM, flash memory or other memory technology, CD-ROM, DVD, or other optical storage, Magnetic cassettes, magnetic tape magnetic tape storage or other magnetic storage devices, or any other non-transitory medium, may be used to store information that may be accessed by a computing device. As defined herein, computer readable storage media do not include non-transitory transitory media such as modulated data signals and carriers.

Specifically, the input device 402 receives input information from the outside, and transfers the input information to the processor(s) 406 by using the input interface 404. The processor(s) 406 process the input information based on a computer executable instruction stored in the memory 408 to generate output information, temporarily or permanently stores the output information in the memory 408, and then transfers the output information to the output device 412 by using the output interface 410. The output device 412 outputs the output information to the outside of the computing device 400 for use by a user.

In other words, the computing device shown in FIG. 4 may also be implemented as a neural network computing device. The neural network computing device may include: a memory storing a computer executable instruction; and a processor, wherein when executing the computer executable instruction, the processor may implement the neural network computing method shown in FIG. 3. Here, the processor may communicate with a neural network to execute the computer executable instruction based on related information from the neural network, thus implementing the neural network computing method shown in FIG. 3.

An example embodiment of the present disclosure further provides a computer readable storage medium, wherein the computer storage medium stores a computer program instruction; and when the computer program instruction is executed by a processor, the neural network computing method provided in the example embodiment of the present disclosure.

Because a connection weight provided in this example embodiment of the present disclosure is a power of 2, a neural network provided in this example embodiment of the present disclosure is a discrete neural network. Currently, the discrete neural network is trained mainly by using a heuristic algorithm. However, it is relatively slow to train the neural network by using the heuristic algorithm. In view of this, an example embodiment of the present disclosure provides a neural network training method, in which a training problem of a discrete neural network is abstracted into a non-convex discrete constrained optimization problem, and a connection weight of the neural network is solved based on the non-convex discrete constrained optimization problem. Constrained optimization is a numerical algorithm for solving linear or non-linear programming problems with constraint conditions.

For neural network training, a problem model with a constraint condition for the neural network may be constructed based on the connection weight of the neural network, and a connection weight between layers of the neural network may be solved based on the problem model and a solution algorithm of the constrained optimization problem.

Because different solution algorithms of constrained optimization problems correspond to different application scenarios, that is, some solution algorithms are only suitable for solving inequality constrained problems, some solution algorithms are only suitable for solving equality constrained problems, while some solution algorithms are not only suitable for solving the inequality constrained problems, but also suitable for solving the equality constrained problems. In view of this, in this example embodiment of the present disclosure, before the connection weight between the layers of the neural network is solved based on the solution algorithm of the constrained optimization problem, the solution algorithm may be determined based on a constraint condition.

In a specific example embodiment of the present disclosure, an Alternating Direction Method of Multipliers (ADMM) may be used to solve the connection weight between the layers of the neural network. A specific process may include the following steps:

Step 1: A problem model with a constraint condition for a neural network is constructed based on a connection weight of the neural network.

Step 2: The problem model is equivalently transformed based on an indicator function and a consistency constraint.

Step 3: The equivalently transformed problem model is decomposed by using an ADMM.

Step 4: The connection weight of the neural network is solved for each sub-problem obtained after decomposition.

For example, it is assumed that the neural network in this example embodiment of the present disclosure is expressed as f(W), where W={$W_1$, $W_2$, . . . , $W_d$}, and $W_i$ is an $i^{th}$ connection weight of the neural network.

A target training model of the neural network f(W) is:

$$\min_W f(W)$$

In an example embodiment of the present disclosure, it is assumed that the neural network is a triple neural network with connection weights constrained as −1, 0, and 1. Then training of the triple neural network may be summarized as the following constrained optimization problem:

$$\min_W f(W)$$
$$\text{s.t. } W \in C = \{-1, 0, +1\}^d$$

where s.t. $W \in C = \{-1, 0, +1\}^d$ indicates that a value of a connection weight W is constrained within a connection weight space C, where the connection weight space C includes −1, 0, and +1, that is, the value of the connection weight W may only be −1, 0, or +1.

The indicator function in this example embodiment of the present disclosure is expressed as follows:

$$I_C(X) = \begin{cases} 0 & \text{if } X \in C \\ \infty & \text{if } X \notin C \end{cases} \quad (1)$$

The indicator function $I_C(X)$ is a function defined on a set X, and indicates which elements belong to a sub-set C.

In this example embodiment of the present disclosure, a new variable G is introduced here, and a consistency constraint condition is set to W=G. With reference to the foregoing indicator function $I_C(X)$, the constrained optimization problem in this example embodiment of the present disclosure is equivalent to:

$$\min_{W,G} f(W) + I_C(G) \quad (2)$$
$$\text{s.t. } W = G \quad (3)$$

A corresponding augmented Lagrangian multiplier is expressed as:

$$L_\rho(W, G, \lambda) = f(W) + I_C(G) + \frac{\rho}{2}\|W - G\|^2 + <\lambda, W - G> \quad (4)$$

where λ is a Lagrangian multiplier, and ρ is a coefficient of a regular term.

For the formula (2) and the formula (3), the indicator function acts on G, and an original connection weight W does not have a discrete constraint in this case. The connection weight is decoupled from the discrete constraint by using the indicator function $I_C(X)$ and the consistency constraint condition W=G.

Based on the ADMM, the constrained optimization problem is decomposed into the following three sub-problems for iterative solution:

$$W^{k+1} := \arg\min_W L_\rho(W, G^k, \lambda^k) \quad (5)$$

$$G^{k+1} := \arg\min_G L_\rho(W^{k+1}, G, \lambda^k) \quad (6)$$

$$\lambda^{k+1} := \lambda^k + \rho(W^{k+1} - G^{k+1}) \quad (7)$$

where k in the formula (5), the formula (6), and the formula (7) is the number of iteration rounds.

During computing in an example embodiment, the formula (5), the formula (6), and the formula (7) are iteratively solved. In an iterative loop, the following process is performed:

First, unconstrained solution is performed on the connection weight W in the formula (5). Based on G and λ (that is, $G^k$ and $\lambda^k$) in a $k^{th}$ round of iteration, unconstrained solution is performed on W (that is, $W^{k+1}$) in a $(k+1)^{th}$ round.

Then, G with a constraint condition in the formula (6) is solved. Based on λ (that is, $\lambda^k$) in the $k^{th}$ round of iteration and W (that is, $W^{k+1}$) obtained through solution based on the formula (5), constrained solution is performed on G (that is, $G^{k+1}$) in the $(k+1)^{th}$ round.

Next, λ is updated based on the formula (7). Based on λ (that is, $\lambda^k$) in the $k^{th}$ round of iteration, W (that is, $W^{k+1}$) solved based on the formula (5), and G (that is, $G^{k+1}$) solved based on the formula (6), λ (that is, $\lambda^{k+1}$) in the $(k+1)^{th}$ round is solved and updated.

Finally, G obtained through solution is the connection weight.

In an example embodiment of the present disclosure, the connection weight obtained through solution is a power of 2, which may facilitate the shift operation of the processor mentioned in the foregoing description, and increase an operation speed of the processor. In another example embodiment of the present disclosure, the connection weight obtained through solution may be any real number.

It should be noted that the foregoing formulas are easy to solve, and therefore a neural network training speed may be increased.

It should be clear that the present disclosure is not limited to the specific configuration and processing that are described above and shown in the figures. For brevity, detailed descriptions of known methods are omitted here. In the foregoing example embodiments, some specific steps are described and shown as examples. However, the method process of the present disclosure is not limited to the specific steps that are described and shown, and those skilled in the art may make various changes, modifications, or additions, or change an order between steps after understanding the spirit of the present disclosure.

The functional blocks shown in the structural block diagrams described above may be implemented as hardware, software, firmware, or their combinations. When implemented by hardware, the functional block may be, for example, an electronic circuit, an application-specific integrated circuit (ASIC), suitable firmware, a plug-in, a function card, or the like. When implemented by software, the elements of the present disclosure are programs or code segments that are used to perform required tasks. The programs or the code segments may be stored in a machine readable medium, or transmitted on a transmission medium or a communication link by using a data signal carried in a carrier. The "machine readable medium" may include any medium capable of storing or transmitting information. Examples of the machine readable medium include an electronic circuit, a semiconductor memory device, a ROM, a flash memory, an erasable ROM (EROM), a floppy disk, a CD-ROM, an optical disc, a hard disk drive, a fiber medium, a radio frequency (RF) link, and the like. The code segments may be downloaded over a computer network such as the Internet or an intranet.

It should also be noted that the exemplary example embodiments mentioned in the present disclosure describe some methods or systems based on a series of steps or apparatuses. However, the present disclosure is not limited to the order of the steps above, that is, the steps may be performed in the order mentioned in the example embodiments, or in an order different from the order in the example embodiments, or several steps may be simultaneously performed.

The foregoing descriptions are merely specific example embodiments of the present disclosure. It may be clearly understood by those skilled in the art that, to make the description convenient and concise, for a specific working process of the foregoing systems, modules, and units, reference may be made to a corresponding process in the foregoing method example embodiments, and details are not described here again. It should be understood that the protection scope of the present disclosure is not limited thereto. Any equivalent modification or replacement readily figured out by those skilled in the art within the technical scope disclosed in the present disclosure shall fall within the protection scope of the present disclosure.

The present disclosure may further be understood with clauses as follows.

Clause 1. A neural network computing method, wherein the method comprises:

receiving, by a processor, a computing instruction for a neural network, wherein the computing instruction for the neural network comprises a computing rule for the neural network and a connection weight of the neural network, and the connection weight is a power of 2; and inputting, for a multiplication operation in the computing rule for the neural network, a source operand corresponding to the multiplication operation to a shift register, and performing a shift operation based on a connection weight corresponding to the multiplication operation, wherein the shift register outputs a target result operand as a result of the multiplication operation.

Clause 2. The method of clause 1, wherein the connection weight corresponding to the multiplication operation is 2 to the power of N, and N is an integer greater than zero; and the step of inputting a source operand corresponding to the multiplication operation to a shift register, and performing a shift operation based on a connection weight corresponding to the multiplication operation comprises:

inputting the source operand corresponding to the multiplication operation to the shift register, and shifting to the left N times.

Clause 3. The method of clause 1, wherein the connection weight corresponding to the multiplication operation is 2 to the power of negative N, and N is an integer greater than zero; and the step of inputting a source operand corresponding to the multiplication operation to a shift register, and performing a shift operation based on a connection weight corresponding to the multiplication operation comprises:

inputting the source operand corresponding to the multiplication operation to the shift register, and shifting to the right N times.

Clause 4. The method of clause 1, wherein the processor is any one of the following processors:

a processor based on an x86 architecture, a processor based on an Advanced Reduced instruction set computing Machine (ARM) architecture, a processor based on a Microprocessor without Interlocked Piped Stages (MIPS) architecture, and a processor based on a dedicated architecture.

Clause 5. The method of clause 1, wherein the number of bits of the source operand is not greater than the number of bits of a value that may be stored in the shift register.

Clause 6. The method of clause 1, wherein the processor does not comprise a multiplication operation unit.

Clause 7. A processor, comprising:

a value obtaining unit configured to receive a computing instruction for a neural network, wherein the computing instruction for the neural network comprises a computing rule for the neural network and a connection weight of the neural network, and the connection weight is a power of 2; and a shift register configured to receive, for a multiplication operation in the computing rule for the neural network, a source operand corresponding to the multiplication operation; perform a shift operation based on a connection weight corresponding to the multiplication operation; and output a target result operand as a result of the multiplication operation.

Clause 8. The processor of clause 7, wherein the connection weight corresponding to the multiplication operation is 2 to the power of N, and N is an integer greater than zero; and the performing a shift operation based on a connection weight corresponding to the multiplication operation comprises:

shifting the source operand to the left N times.

Clause 9. The processor of clause 7, wherein the connection weight corresponding to the multiplication operation is 2 to the power of negative N, and N is an integer greater than zero; and the performing a shift operation based on a connection weight corresponding to the multiplication operation comprises:

shifting the source operand to the right N times.

Clause 10. The processor of clause 7, wherein the processor is any one of the following processors:

a processor based on an x86 architecture, a processor based on an ARM architecture, a processor based on an MIPS architecture, and a processor based on a dedicated architecture.

Clause 11. The processor of clause 7, wherein the number of bits of the source operand is not greater than the number of bits of a value that may be stored in the shift register.

Clause 12. The processor of clause 7, wherein the processor does not comprise a multiplication operation unit.

Clause 13. A computer readable storage medium, wherein the computer storage medium stores a computer program instruction; and when the computer program instruction is executed by a processor, the neural network computing method of any of clauses 1 to 7 is implemented.

Clause 14. A neural network computing method, wherein the method comprises:

receiving a computing instruction for a neural network, wherein the computing instruction for the neural network comprises a computing rule for the neural network and a connection weight of the neural network, and the connection weight is a power of 2;

performing, for a multiplication operation in the computing rule for the neural network, a shift operation on a source operand corresponding to the multiplication operation based on a connection weight corresponding to the multiplication operation; and using a result operand of the shift operation as a result of the multiplication operation.

Clause 15. The method of clause 14, wherein the connection weight corresponding to the multiplication operation is 2 to the power of N, and N is an integer greater than zero; and the step of performing a shift operation on a source operand corresponding to the multiplication operation based on a connection weight corresponding to the multiplication operation comprises:

shifting the source operand to the left N times.

Clause 16. The method of clause 14, wherein the connection weight corresponding to the multiplication operation is 2 to the power of negative N, and N is an integer greater than zero; and the step of performing a shift operation on a source operand corresponding to the multiplication operation based on a connection weight corresponding to the multiplication operation comprises:

shifting the source operand to the right N times.

Clause 17. A neural network computing device, wherein the device comprises: a memory and a processor;

the memory is configured to store executable computer-readable instructions; and the processor is configured to read the executable computer-readable instructions stored in the memory to perform the neural network computing method of any of clauses 14 to 16.

Clause 18. A computer readable storage medium, wherein the computer storage medium stores a computer program instruction; and when the computer program instruction is executed by a processor, the neural network computing method of any of clauses 14 to 16 is implemented.

What is claimed is:

1. A method comprising:
   receiving a computing instruction for a neural network, the computing instruction for the neural network including a computing rule for the neural network and a connection weight of the neural network;
   inputting, for a multiplication operation in the computing rule for the neural network, a source operand corresponding to the multiplication operation to a shift register;
   performing a shift operation based on a connection weight corresponding to the multiplication operation.

2. The method of claim 1, further comprising outputting a target result operand as a result of the multiplication operation.

3. The method of claim 1, wherein the connection weight corresponding to the multiplication operation is 2 to the power of N, and N is an integer greater than zero.

4. The method of claim 3, wherein the inputting the source operand corresponding to the multiplication operation to the shift register includes:
   inputting the source operand corresponding to the multiplication operation to the shift register; and
   shifting to left N times.

5. The method of claim 1, wherein the connection weight corresponding to the multiplication operation is 2 to the power of negative N, and N is an integer greater than zero.

6. The method of claim 5, wherein the inputting the source operand corresponding to the multiplication operation to the shift register includes:
   inputting the source operand corresponding to the multiplication operation to the shift register; and
   shifting to right N times.

7. The method of claim 1, wherein the receiving the computing instruction for the neural network includes:
   receiving, by a processor, the computing instruction for the neural network.

8. The method of claim 7, wherein the processor includes any one of the following processors:
   a processor based on an x86 architecture;
   a processor based on an Advanced Reduced instruction set computing Machine (ARM) architecture;
   a processor based on a Microprocessor without Interlocked Piped Stages (MIPS) architecture; and
   a processor based on a dedicated architecture.

9. The method of claim 7, wherein the processor does not include a multiplication operation unit.

10. The method of claim 1, wherein a number of bits of the source operand is not greater than a number of bits of a value that is capable to be stored in the shift register.

11. A processor comprising:
    a value obtaining unit that receives a computing instruction for a neural network, the computing instruction for the neural network including a computing rule for the neural network and a connection weight of the neural network; and
    a shift register that receives, for a multiplication operation in the computing rule for the neural network, a source operand corresponding to the multiplication operation; performs a shift operation based on a connection weight corresponding to the multiplication operation; and outputs a target result operand as a result of the multiplication operation.

12. The processor of claim 11, wherein:
    the connection weight corresponding to the multiplication operation is 2 to the power of N, and N is an integer greater than zero; and
    the shift register shifts the source operand to left N times.

13. The processor of claim 11, wherein:
    the connection weight corresponding to the multiplication operation is 2 to the power of negative N, and N is an integer greater than zero; and
    the shift register shifts the source operand to right N times.

14. The processor of claim 11, wherein the processor includes any one of the following processors:
    a processor based on an x86 architecture;
    a processor based on an Advanced Reduced instruction set computing Machine (ARM) architecture;
    a processor based on a Microprocessor without Interlocked Piped Stages (MIPS) architecture; and
    a processor based on a dedicated architecture.

15. The processor of claim 11, wherein a number of bits of the source operand is not greater than a number of bits of a value that is capable to be stored in the shift register.

16. The processor of claim 11, wherein the processor does not include a multiplication operation unit.

17. A method comprising:
    receiving a computing instruction for a neural network, the computing instruction for the neural network including a computing rule for the neural network and a connection weight of the neural network, and the connection weight being a power of 2; and
    performing, for a multiplication operation in the computing rule for the neural network, a shift operation on a source operand corresponding to the multiplication operation based on a connection weight corresponding to the multiplication operation.

18. The method of claim 17, further comprising:
using a result operand of the shift operation as a result of the multiplication operation.

19. The method of claim 17, wherein:
the connection weight corresponding to the multiplication operation is 2 to the power of N, and N is an integer greater than zero; and
the performing the shift operation on a source operand corresponding to the multiplication operation based on the connection weight corresponding to the multiplication operation includes:
shifting the source operand to left N times.

20. The method of claim 17, wherein:
the connection weight corresponding to the multiplication operation is 2 to the power of negative N, and N is an integer greater than zero; and
the performing the shift operation on a source operand corresponding to the multiplication operation based on the connection weight corresponding to the multiplication operation includes:
shifting the source operand to the right N times.

* * * * *